April 1, 1930.   K. MARTIN ET AL   1,752,680
OPTICAL MEANS FOR PRODUCING COLOR CINEMATOGRAPHIC PICTURES
Filed April 19, 1927

Inventors
Karl Martin
Paul Tietze
By King & Roy
attys

Patented Apr. 1, 1930

1,752,680

UNITED STATES PATENT OFFICE

KARL MARTIN AND PAUL TIETZE, OF RATHENOW, GERMANY

OPTICAL MEANS FOR PRODUCING COLOR CINEMATOGRAPHIC PICTURES

Application filed April 19, 1927, Serial No. 185,033, and in Germany April 24, 1926.

The invention relates to improvements in those polychromatic cinematographic taking systems in which each component picture has allotted to it a special objective, and in which the division of the complex of rays takes place before the objectives, in the manner described, for example, in the U. S. Letters Patent 660,442 of Ives.

Figure 1:
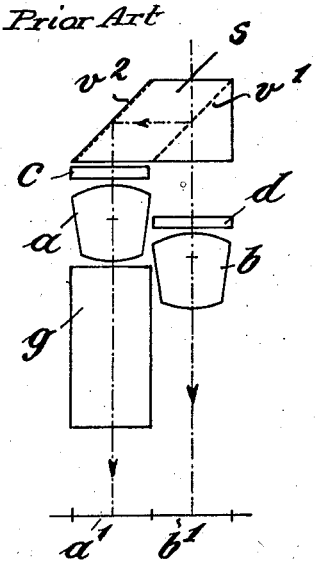

Fig. 1 of the drawing which accompanies this specification and forms part thereof, illustrates this known arrangement. $a$ and $b$ denote here the two objectives which are arranged behind a ray-dividing system $s$. This system comprises a mirror face $v^1$ that partly reflects rays and is partly pervious to light, and a fully reflecting mirror face $v^2$. The component pictures $a^1$ and $b^1$ are to lie in a common plane, as this is required, e. g., for cinematographic purposes. The pencil of rays producing the component picture $a^1$ is deflected from the complex of rays entering the dividing system $s$, by the reflecting portion of the mirror face $v^1$ and is directed toward the objective $a$ by the fully reflecting face $v^2$, while the pencil of rays required to produce the component picture $b^1$ passes through the partly light-pervious mirror face $v^1$ and enters the objective $b$. In order to have the two pictures of the same scale for every distance of the objects to be taken, the objectives are displaced relatively to one another in axial direction so that the lengths of the optical paths on the objective side are the same for both objectives, account being taken of the thickness of the glass. To compensate for the difference of the light paths on the picture side a glass block $g$ has to be inserted in the path of the objective $a$. $c$, $d$ denote the colour filters interposed before the objectives.

As the distance existing between the middle lines of the component pictures is very small and amounts, e. g., to no more than 12 mm. with the two-colour process in which the two component pictures are produced in the normal cinematographic size, with the above-described structure of the optical system as shown in Fig. 1 only objectives can be used that have a diameter of no more than 12 mm. including their mountings. This results in a very small relative objective aperture, due to the focal lengths of objectives used for taking moving pictures. Such small apertures must be obviated particularly in taking polychromatic pictures, for which work a comparatively large aperture of the objectives is required.

To obviate this drawback, the objectives are arranged according to the invention away from one another and the picture-producing pencils of rays leaving them are caused to approach one another again by prism systems. Objectives of any desired diameter, that is of any desired relative aperture, may be used and the component pictures may be produced notwithstanding in a common plane and, as usual, in juxtaposed disposition.

In order to keep the ray-dividing prism systems as small as possible consistent with the complete covering of the aperture angle of the objectives, the objectives are arranged at a right angle to one another and immediately behind the ray-dividing prisms system in such a manner that one objective receives the reflected rays directly and the other receives the transmitted rays directly.

Figure 2:
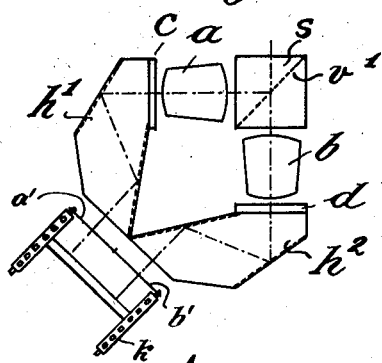

Fig. 2 of the drawing illustrates an embodiment of the improved picture taking system.

As in the known arrangement shown in Fig. 1, $s$ denotes the ray-dividing system comprising the silver face $v^1$ which is in part pervious to light and in part reflecting. An objective $a$ is arranged to receive the reflected rays directly from the partially reflecting surface $v^1$ except for the interposition of a color filter $c$. An objective $b$ receives the rays transmitted through the reflecting surface $v^1$ after they pass through a color filter $d$.

The two objectives $a$ and $b$ are arranged on axes perpendicular to one another and lying at 45 degrees with respect to the plane of the partially reflecting surface $v^1$. Behind the objectives are two similar and symmetrically arranged prisms $h^1$ and $h^2$, the exit faces of which together with the plane of the film $a^1$, $b^1$ are perpendicular to the mirror face $v^1$. The film $a^1$, $b^1$ is moved past the exit faces of the prisms $h^1$, $h^2$ by driving sprockets K. The filters $c$, $d$ are in this case arranged between the objectives $a$, $b$ and the prisms $h^1$, $h^2$ but may be arranged at other positions in the paths of the rays.

What we claim and desire to secure by Letters Patent, is:—

In a device of the class described, a ray-dividing device comprising a partly light-pervious mirror, a pair of objectives arranged upon axes perpendicular to one another and positioned so that one objective receives directly the rays reflected from said mirror, while the other objective receives directly the rays transmitted through said mirror, means for passing a film perpendicular at its midline to the plane of said mirror, and optical means for turning the rays from said objectives into parallel contiguous paths registering respectively with the two halves of said film.

In testimony whereof the foregoing specification is signed.

KARL MARTIN.
PAUL TIETZE.